(12) United States Patent
Yoshioka et al.

(10) Patent No.: US 12,319,617 B2
(45) Date of Patent: Jun. 3, 2025

(54) CEMENT GROUT MATERIAL AND INSTALLATION METHOD OF SAME

(71) Applicants: NIPPON HIGH STRENGTH CONCRETE CO., LTD., Sapporo (JP); NISSAN CHEMICAL CORPORATION, Tokyo (JP)

(72) Inventors: Kenichi Yoshioka, Sapporo (JP); Yuhji Sudoh, Tokyo (JP)

(73) Assignees: NIPPON HIGH STRENGTH CONCRETE CO., LTD., Sapporo (JP); NISSAN CHEMICAL CORPORATION, Sappporo (JP)

( * ) Notice: Subject to any disclaimer, the term of this patent is extended or adjusted under 35 U.S.C. 154(b) by 624 days.

(21) Appl. No.: 17/634,073

(22) PCT Filed: Jul. 7, 2020

(86) PCT No.: PCT/JP2020/026516
§ 371 (c)(1),
(2) Date: Feb. 9, 2022

(87) PCT Pub. No.: WO2021/039133
PCT Pub. Date: Mar. 4, 2021

(65) Prior Publication Data
US 2022/0348499 A1 Nov. 3, 2022

(30) Foreign Application Priority Data
Aug. 23, 2019 (JP) .................................. 2019-152449

(51) Int. Cl.
*C04B 22/08* (2006.01)
*C04B 28/02* (2006.01)
(Continued)

(52) U.S. Cl.
CPC ............ *C04B 22/085* (2013.01); *C04B 28/02* (2013.01); *C04B 2111/26* (2013.01); *C04B 2111/70* (2013.01); *C04B 2111/76* (2013.01)

(58) Field of Classification Search
CPC ... C04B 22/085; C04B 28/02; C04B 2111/26; C04B 2111/70; C04B 2111/76;
(Continued)

(56) References Cited

U.S. PATENT DOCUMENTS

2009/0031925 A1   2/2009   Furusawa et al.

FOREIGN PATENT DOCUMENTS

| CN | 107244858 A | 10/2017 |
| JP | 60-164556 A | 8/1985 |

(Continued)

OTHER PUBLICATIONS

JPH10259050-A_Machine_Translation (Year: 1998).*
(Continued)

*Primary Examiner* — Bryan D. Ripa
*Assistant Examiner* — Anastasia A. Kuvayskaya
(74) *Attorney, Agent, or Firm* — Chrisman Gallo Tochtrop LLC

(57) ABSTRACT

A cement grout material which does not freeze even in an environment where the ambient temperature can be −5° C. or below, and does not require fuel or large-scaled equipment for maintaining curing temperature. Lithium nitrite is added to a cement grout material that contains cement, water and an admixture. By setting the weight ratio of the lithium nitrite to the cement to a value from 3 to 10% by weight, freezing of the grout material is able to be prevented even in an installation environment where the ambient temperature can be −5° C. during the initial stage of installation. By setting the weight ratio of the lithium nitrite to the cement to a value from 4.5 to 8% by weight, freezing of the grout
(Continued)

material is able to be prevented even in an installation environment where the ambient temperature can be −10° C. during the initial stage of installation.

2 Claims, 3 Drawing Sheets

(51) Int. Cl.
 *C04B 111/26* (2006.01)
 *C04B 111/70* (2006.01)
 *C04B 111/76* (2006.01)

(58) Field of Classification Search
 CPC . C04B 2103/0008; C04B 28/04; C04B 40/02; C04B 2111/72; E04G 21/12
 See application file for complete search history.

(56) References Cited

FOREIGN PATENT DOCUMENTS

| JP | 06234556 A | * | 8/1994 | ............. C04B 22/08 |
|---|---|---|---|---|
| JP | 10259050 A | * | 9/1998 | ........... C04B 22/085 |
| JP | 2004-052413 A | | 2/2004 | |
| JP | 2006-273680 A | | 10/2006 | |
| JP | 2007-001828 A | | 1/2007 | |
| JP | 2007-119268 A | | 5/2007 | |
| JP | 2008-031008 A | | 2/2008 | |
| JP | 2012-087022 A | | 5/2012 | |
| JP | 2013-002056 A | | 1/2013 | |
| JP | 2015-202994 A | | 11/2015 | |
| JP | 2017-206418 A | | 11/2017 | |
| JP | 2018-140889 A | | 9/2018 | |

OTHER PUBLICATIONS

Lee et al. Comparative study on corrosion protection of reinforcing steel by using amino alcohol and lithium nitrite inhibitors. Materials. 2015. 8, 251-269. (Year: 2015).*
JP 06234556 A_Machine Translation (Year: 1994).*
JISA 1108 2018 (Year: 2018).*
International Search Report for corresponding International Application No. PCT/JP2020/026516 mailed Sep. 1, 2020.
Written Opinion for corresponding International Application No. PCT/JP2020/026516 mailed Sep. 1, 2020.
Extended European Search Report issued in corresponding application, EP 20856914.5, dated Aug. 9, 2023.
Todo et al., "Applicability of Lithium Nitrite to Cold Weather Concrete", 51st Annual Conference of the Japan Society of Civil Engineers, Sep. 1996, pp. 470-471.

* cited by examiner

CEMENT GROUT MATERIAL AND INSTALLATION METHOD OF SAME

CROSS-REFERENCE TO RELATED APPLICATIONS

This application is a U.S. National Stage entry of PCT/JP2020/026516, filed Jul. 7, 2020, which claims benefit of priority to Japanese application 2019-152449, filed Aug. 23, 2019, the entire disclosures of which are hereby incorporated herein by reference.

TECHNICAL FIELD

This invention relates to a cement grout material which does not freeze and thereby ensures the quality without need to use any large-scaled equipment or heating means for curing, even in an environment of −5° C. or below, and also to an installation method of the same.

BACKGROUND ARTS

A material mainly containing a cement grout material has been often put into practical use to fill a small void-type duct placed inside a structure such as bridges, dams and buildings or as a narrow part repairing material and a grout material (which will be hereinafter referred to as "PC grout material") which is to be filled in a sheath into which a PC steel member for prestressed concrete is inserted, for instance. However, for a fresh cement grout material immediately after having been filled or applied to repairing, freezing of water contained therein occurs in a subfreezing environment. The cement grout material in a state of involving frozen water shall cause a remarkable strength reduction or like quality degradation phenomenon called a frost damage, for instance.

Meanwhile, the season during which an average daytime temperature reaches 4° C. or below is defined to be a cold weather season, and freezing of the cement grout material used as the PC grout material is likely to occur depending on the region and the season, so that grouting works of the PC grout material shall be advised not to take place during the cold weather season, as one practical standard. When grout material installation is done during the cold weather season due to unavoidable circumstances, freezing of the cement grout material would occur, resulting in obtaining no strength, or the cement grout material would be expanded due to freezing, resulting in developing cracks in the surrounding concrete, in some cases.

In this connection, the standard specifications for concrete structures, provided by Japan Society of Civil Engineers, shall specify that in principle, the temperature of a duct and therearound is to be 5° C. or above before PC grout injection and also to be kept at 5° C. or above at least for three days after the injection.

For the purpose of preventing such frost damage, some countermeasures shall be taken to provide a curing enclosure, together with use of heating equipment such as a jet heater, so as to maintain a heating/heat-insulating curing condition until a strength assumed to be not affected by the frost damage is obtained, in the regions where a minus temperature (0° C. or below) can be reached in the winter term, such as Hokkaido and Tohoku regions in Japan, for instance. However, in order to allow the duct or repaired part being part of the structure in a cold region to be maintained in the heating/heat-insulating curing condition, there exists the need to provide a large-scaled curing enclosure which is to cover the whole or most part of the structure, and accordingly, a curing enclosure size has become too large in proportion to an amount of the cement grout material to be used, in addition to a considerable increase in the cost of a fuel to be used for the heating equipment, in most cases.

As the inventions relating to the PC grout material or to cement or concrete for use in the cold region, there are the following inventions as disclosed in patent documents 1 to 7 below, for instance.

The patent document 1 discloses a construction method of prestressed concrete by using post-tensioning in a cold environment, wherein for construction of prestressed concrete by using post-tensioning of injecting cement grout into a sheath so as to be filled therein in the cold environment of 0° C. or below, the cement grout in which an admixture consisting of 1 part by weight of a high-performance water reducing agent and 3 to 10 parts by weight of nitrite or a mixture of nitrite and nitrate is contained in an amount of 1 to 5% by weight based on cement is injected into the sheath inside a concrete structure until it is filled in the sheath, and any measures to prevent freezing of the cement grout are not taken after the cement grout has been injected and filled.

In this patent document 1, it is stated that examples of available nitrites and nitrates include alkali metal salt such as ammonium salt, sodium salt and potassium salt and alkaline earth metal salt such as calcium salt, for instance.

The patent document 2 discloses a PC tendon corrosion inhibiting method, wherein for inhibition of the corrosion of a PC tendon of a post-tensioned type PC structure, supply of water into a grout material unfilled space inside a sheath is performed to remove or decrease a chloride ion being present inside the sheath or a rust layer, followed by removal of the water therefrom to fill a grout material in the space from which the water has been removed.

The patent document 3 discloses PC grout to be injected into a sheath of a PC structure, wherein the PC grout contains nitrite as a rust preventive agent, while being mixed with, as a chloride ion immobilizing material, powder containing $CaO \cdot 2Al_2O_3$ in Portland cement.

The patent document 4 discloses cold-resistant concrete mixed with both an anti-freezing agent mainly containing lithium nitrite and an air entraining (AE) agent for generation of fine air bubbles or an air entraining and water reducing agent.

The patent document 5 discloses an anti-freezing cement admixture consisting of polycarboxylic acid alkali metal or polycarboxylic acid alkaline earth metal. In this patent document 5, it is stated that the alkali metal can be potassium, sodium or lithium, and otherwise, the alkaline earth metal can be calcium.

The patent document 6 discloses a cement composition containing paraffin and nitrite, as one cement composition which is excellently effective in inhibition of injury from salt and is also superior in durability.

The patent document 7 discloses a concrete durability improving agent at least containing a shrinkage reducing agent, paraffin and nitrite, as one concrete durability improving agent which is highly effective in shrinkage reduction and is also capable of inhibiting a reduction of concrete freezing-thawing resistance even though the shrinkage reducing agent is involved. In this patent document 7, it is stated that the nitrite can be one or more kinds of nitrites selected from a group consisting of calcium nitrite, lithium nitrite, sodium nitrite, potassium nitrite, magnesium nitrite, barium nitrite, beryllium nitrite, zinc nitrite and strontium nitrite.

PRIOR ART DOCUMENTS

Patent Documents

Patent document 1: JP-A S60-164556
Patent document 2: JP-A 2013-002056
Patent document 3: JP-A 2017-206418
Patent document 4: JP-A H10-259050
Patent document 5: JP-A 2007-119268
Patent document 6: JP-A 2015-202994
Patent document 7: JP-A 2018-140889

SUMMARY OF THE INVENTION

Problems to be Solved by the Invention

The invention disclosed in the patent document 1 specifies that the mixture involving the nitrite is contained in the cement grout, in which case, however, when even among the nitrites, the calcium nitrite is added, the resultant cement grout causes flowability deterioration because of the occurrence of a situation where it becomes hardened at once when kneaded and accordingly, would be difficult to be used as PC grout for injecting into a sheath so as to be filled therein. Also, when the sodium nitrite is added, for instance, the resultant cement grout is likely to cause an alkali aggregate reaction and accordingly, would be difficult to be applied to installation in an environment of a minus temperature (0° C. or below).

The invention disclosed in the patent document 2 is to inhibit the corrosion of the PC tendon by using the lithium nitrite as a rust preventive agent, whereas the matters relating to an aspect of the strength or applications to installation in an environment of 0° C. or below are not taken into account.

The invention disclosed in the patent document 3 specifies that the nitrite is also involved as the rust preventive agent and CaO·2Al$_2$O$_3$ is added to immobilize the chloride ion, whereas the matters relating to an aspect of the strength or applications to installation in an environment of 0° C. or below are not taken into account, likewise the invention disclosed in the patent document 2.

The inventions disclosed in the patent documents 4, 5 and 7 are all targeted for the concrete and accordingly, may not have a chance for use as the PC grout, for instance.

The invention disclosed in the patent document 6 specifies that the paraffin and the nitrite are involved in the cement composition in expectation of the salt injury inhibition effect in the concrete structure, whereas this cement composition is not intended for use as cold weather concrete.

In view of the above background, an object of the present invention is to provide a cement grout material which does not freeze even in an environment where the ambient temperature can be −5° C. or below, thereby ensuring the quality, and which does not require a fuel or large-scaled equipment such as a curing enclosure for maintaining the curing temperature, and also to provide an installation method of the same.

Means for Solving the Problems

As a result of intensive studies made by the present inventors et al. in order to attain the above object, it has been found that a cement grout material added with a specific amount of lithium nitrite can ensure the sufficient quality without taking any frost damage countermeasures in installation during the cold weather season, thereby completing the present invention.

Namely, the present invention is to provide the followings:

1. A cement grout material containing cement, water and an admixture, the cement grout material being characterized in that lithium nitrite is added to the cement grout material, and the weight ratio of the lithium nitrite to the cement is in the range of 3 to 10% by weight,
2. The cement grout material described in the above item 1, wherein the cement grout material includes a cold weather cement grout material intended for applications to installation in an environment where the ambient temperature can be −5° C. during the initial stage of installation,
3. A cement grout material containing cement, water and an admixture, the cement grout material being characterized in that lithium nitrite is added to the cement grout material, and the weight ratio of the lithium nitrite to the cement is in the range of 4.5 to 8% by weight,
4. The cement grout material described in the above item 3, wherein the cement grout material includes a cold weather cement grout material intended for applications to installation in an environment where the ambient temperature can be −10° C. during the initial stage of installation,
5. The grout material described in the above item 1, wherein the cement grout material includes a cement grout material intended for applications to installation in a highly corrosive environment where a steel member is subjected to corrosion caused by a chloride ion,
6. An installation method of a cement grout material containing cement, water and an admixture, wherein lithium nitrite is added to the cement grout material, and the weight ratio of the lithium nitrite to the cement is in the range of 3 to 10% by weight, the cement grout material installation method being characterized in that curing or heating is performed such that an installation environment in places to install the cement grout material is kept at a temperature of −5° C. or above, and
7. An installation method of a cement grout material containing cement, water and an admixture, wherein lithium nitrite is added to the cement grout material, and the weight ratio of the lithium nitrite to the cement is in the range of 4.5 to 8% by weight, the cement grout material installation method being characterized in that curing or heating is performed such that an installation environment in places to install the cement grout material is kept at a temperature of −10° C. or above.

Effects of the Invention

It can be appreciated that use of the cement grout material of the present invention eliminates the need to use any large-scaled curing equipment or fuel as having been heretofore taken as the frost damage countermeasures, thereby resulting in enabling a considerable reduction in working time and labor or cost. When the lithium nitrite is added in an amount of 3 to 10% by weight based on the cement, the resultant cement grout material can be applied to installation as it is even in an environment of −5° C. Also, when the lithium nitrite is added in an amount of 4.5 to 8% by weight based on the cement, the resultant cement grout material can be applied to installation as it is even in an environment of −10° C.

According to the installation method of the cement grout material of the present invention, it can be appreciated that in applications of the cement grout material to installation in an environment where the ambient temperature can be 0° C. or below, for instance, the lithium nitrite is added in an amount of 3 to 10% by weight based on the cement, thereby resulting in allowing freezing of the installed grout material to be prevented so as to ensure the quality without need to use any large-scaled equipment such as the curing enclosure for maintaining the curing temperature or any fuel for heating, until an installation environment of −5° C. is reached, while when an installation environment where the ambient temperature is lower than −5° C. is reached, curing or heating is performed such that the installation environment in places to install the cement grout material is kept at a temperature of −5° C. or above, thereby resulting in also allowing freezing of the grout material to be prevented so as to ensure the quality.

It can be appreciated also that the lithium nitrite is added in an amount of 4.5 to 8% by weight based on the cement, thereby resulting in allowing freezing of the installed grout material to be prevented so as to ensure the quality without need to use any large-scaled equipment such as the curing enclosure for maintaining the curing temperature or any fuel for heating, until an installation environment of −10° C. is reached, while when an installation environment where the ambient temperature is lower than −10° C. is reached, curing or heating is performed such that the installation environment in places to install the cement grout material is kept at a temperature of −10° or above, thereby resulting in also allowing freezing of the cement grout material to be prevented so as to ensure the quality.

MODE FOR EMBODYING THE INVENTION

Figure 1:
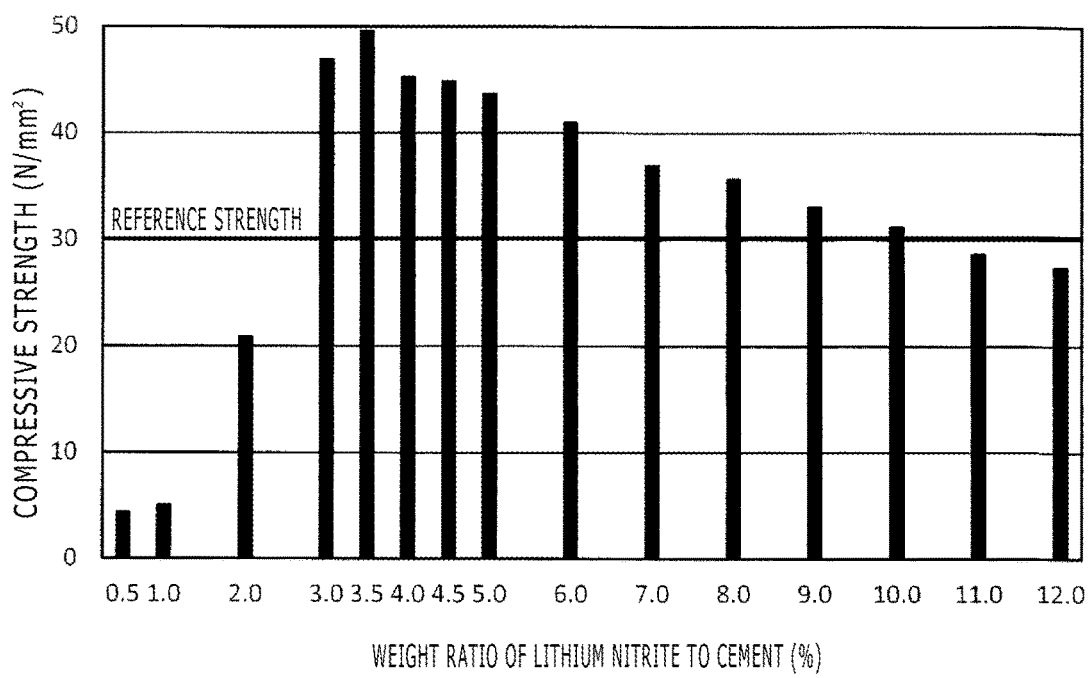
FIG. 1 is a graphic representation of the relation between the weight ratio of lithium nitrite to cement and the compressive strength in the case of a curing temperature having been assumed to be −5° C. in an experiment 2 about a cement grout material according to the present invention.

The present invention is to provide a cement grout material containing cement, water and an admixture, the cement grout material being characterized in that lithium nitrite is added thereto, and the weight ratio of the lithium nitrite to the cement is in the range of 3 to 10% by weight.

While deterioration in grout material strength is likely to occur when the lithium nitrite is added to the cement grout material, it is noted that the present invention shall make use of the lithium nitrite in an allowable range where the grout material can meet its reference strength and quality.

Examples of available admixtures preferably include commercially-available highly-viscous admixtures consisting of compounds such as a water-soluble polymeric ether compound and a melamine sulfonic acid-based compound for the cement grout material, for instance, but are not limited thereto.

The cement to be used can be ordinary Portland cement, high-early-strength cement or mixed cement, for instance, but is not limited by a cement type only if being one causing no problem in quality or durability when the lithium nitrite is added.

The lithium nitrite may be added in an aqueous solution state or a solid state. The concentration in an aqueous solution state case of the lithium nitrite does not matter. However, the concentration of a lithium nitrite aqueous solution is normally in the range of about 5 to 43% by weight, preferably, 25 to 40% by weight from the viewpoint of handling.

The cement grout material of the present invention can be used as a PC grout material for prestressed concrete construction in a cold region during the coldest season, for instance, and is also allowed to be applied to installation even in a cold environment of a temperature as low as −5° C., by adding the lithium nitrite in an amount of 3 to 10% by weight based on the cement.

Namely, when it is assumed that the cement grout material of the present invention is applied to installation in an environment where the ambient temperature can be −5° C. during the initial stage of installation, the lithium nitrite is added in an amount of 3 to 10% by weight based on the cement, thereby resulting in allowing freezing of the installed grout material to be prevented so as to ensure the quality without need to use any large-scaled equipment such as a curing enclosure for maintaining the curing temperature or any fuel for heating.

On the assumption that an installation environment of −5° C. is reached during the initial stage of installation, when the amount of the lithium nitrite added based on the cement is smaller than 3% by weight, a reference strength of 30N/mm$^2$ generally required for PC grout by the material age of 28 days may not be obtained.

When the amount of the lithium nitrite added based on the cement is greater than 10% by weight, the reference strength of 30N/mm$^2$ generally required for the PC grout by the material age of 28 days may not be obtained too.

Incidentally, although a curing enclosure or heating for maintaining an environment of a temperature equivalent to −5° C. or above is necessary when the ambient temperature is predicted to be lower than an initially estimated temperature at the time right after installation, the cost for curing enclosure placements or a heating apparatus can be considerably reduced, as compared with a conventional grout material installation case.

Further, when it is assumed that the grout material is applied to installation in an environment where the ambient temperature can be −10° C. during the initial stage of installation, the lithium nitrite is added in an amount of 4.5 to 8% by weight based on the cement, thereby resulting in allowing freezing of the installed grout material to be prevented so as to ensure the quality without need to use any large-scaled equipment such as the curing enclosure for maintaining the curing temperature or any fuel for heating.

On the assumption that an installation environment of −10° C. is reached during the initial stage of installation, when the amount of the lithium nitrite added based on the cement is smaller than 4.5% by weight, the reference strength of 30N/mm$^2$ generally required for the PC grout by the material age of 28 days may not be obtained.

When the amount of the lithium nitrite added based on the cement is greater than 8% by weight, the reference strength of 30N/mm$^2$ generally required for the PC grout by the material age of 28 days may not be obtained too.

Incidentally, although the curing enclosure or heating for maintaining an environment of a temperature equivalent to −10° C. or above is necessary when the ambient temperature is predicted to be lower than an initially estimated temperature at the time right after installation, the cost for the curing enclosure placements or the heating apparatus can be considerably reduced, as compared with the conventional grout material installation case.

Moreover, the cement grout material of the present invention when applied to installation in the environment where the ambient temperature can be −5° C. or below provides an effect of enabling the considerable reduction in the cost for the curing enclosure placements or the heating apparatus as compared with the conventional grout material installation case, as described above, and in addition to this, it has been experimentally confirmed that the cement grout material of the present invention is excellently effective in preventing the rust of a steel member in an environment where this cement grout material in a hardened state is exposed to a chloride ion (for instance, an effect of preventing the rust of a PC steel wire placed inside a sheath in which the grout material is to be filled), as will be detailed later.

A cement grout material installation method of the present invention is to install a cement grout material containing cement, water and an admixture, wherein lithium nitrite is added to the cement grout material, and the weight ratio of the lithium nitrite to the cement is in the range of 3 to 10% by weight, the cement grout material installation method being characterized in that in applications of the cement grout material to installation in an environment where the ambient temperature can be −5° C. or below, for instance, curing or heating is performed such that an installation environment in places to install the cement grout material is kept at a temperature of −5° C. or above.

As described above, the lithium nitrite is added in an amount of 3 to 10% by weight based on the cement, thereby resulting in allowing freezing of the installed grout material to be prevented so as to ensure the quality without need to use any large-scaled equipment such as the curing enclosure for maintaining the curing temperature or any fuel for heating, until an installation environment of −5° C. is reached, so that when an installation environment where the ambient temperature is lower than −5° C. is reached, curing or heating is performed such that the installation environment in places to install the cement grout material is kept at a temperature of −5° C. or above, thereby resulting in also allowing freezing of the grout material to be prevented so as to ensure the quality.

While an upper limitation on what is allowed at the time when curing or heating is performed is not restricted in particular, it is to be understood that in a mix proportion case of the cement grout material of the present invention, the requisite quality can be maintained even in an environment of less than 5° C. assumed to affect the quality in an ordinary cement grout material case, and accordingly, curing or heating may be performed such that an installation environment is kept substantially about at temperatures in the range of −5° C. or above to less than 5° C. or not more than 0° C. when the ambient temperature is lower than −5° C. It is noted that the term "substantially" stated herein means that there may arise also a situation where some deviation from the above temperature range will temporarily occur in association with temperature control.

Further, the lithium nitrite is added in an amount of 4.5 to 8% by weight based on the cement, thereby resulting in allowing freezing of the installed cement grout material to be prevented so as to ensure the quality without need to use any large-scaled equipment such as the curing enclosure for maintaining the curing temperature or any fuel for heating, until an installation environment of −10° C. is reached, so that when an installation environment where the ambient temperature is lower than −10° C. is reached, curing or heating is performed such that the installation environment in places to install the cement grout material is kept at a temperature of −10° C. or above, thereby resulting in also allowing freezing of the grout material to be prevented so as to ensure the quality.

In this case, curing or heating may be performed such that the installation environment is kept substantially about at temperatures in the range of −10° C. or above to less than 5° C., not more than 0° C. or not more than −5° C. when the ambient temperature is lower than −10° C., for instance.

EXAMPLES

Hereinafter will be described experiments 1 to 3 about the cement grout material according to the present invention, together with comparative experiments when calcium nitrite belonging to the same nitrite group was used instead of the lithium nitrite.

Experiment 1

For an experiment 1, a performance test was carried out based on the assumption of applications to installation in the environment where the ambient temperature can be −10° C. during the initial stage of installation.

Materials for use in the experiment 1 are as follows.

Cement: Ordinary Portland cement

Lithium nitrite: Aqueous solution containing 40% by weight of lithium nitrite

Admixture: Admixture for non-bleeding and highly-viscous high-performance cement grout and grouting mortar (under the tradename "MasterFlow 152" produced by BASF Japan Ltd., "MasterFlow" being a registered trademark of Construction Research & Technology GmbH)

Table 1 lists mix proportions for the experiment 1. In the Table 1, W represents a unit water amount, C represents a unit cement amount, and W/C represents a water-cement ratio.

TABLE 1

| No. | MARKS | MIX PROPORTION | W/C (%) | W (kg) | C (kg) | ADMIXTURE (kg) | 40 WT % LITHIUM NITRITE AQUEOUS SOLUTION (kg) | WEIGHT RATIO OF LITHIUM NITRITE TO CEMENT (%) |
|---|---|---|---|---|---|---|---|---|
| 1 | M-Li2.68 | MIX PROPORTION IN 1 m$^3$ | 42% | 499 | 1327 | 13.3 | 89.0 | 2.68 |
| 2 | M-Li5.25 | MIX PROPORTION IN 1 m$^3$ | 43% | 447 | 1290 | 12.9 | 169.4 | 5.25 |
| 3 | M-Li6.0 | MIX PROPORTION IN 1 m$^3$ | 45% | 447 | 1246 | 12.5 | 186.9 | 6.0 |
| 4 | M-Li9.0 | MIX PROPORTION IN 1 m$^3$ | 43% | 365 | 1260 | 12.6 | 283.5 | 9.0 |

The experiment 1 was performed to inspect the quality in regards to PC grout performances, based on a testing method of flowability of PC grout (JSCE-F531), a testing method of material segregation resistance of PC grout (JSCE-F534), a testing method of bleeding rate and volume change rate of PC grout (JSCE-F535), a testing method of chloride ion content and a testing method of compressive strength of PC grout (JSCE-G531). Table 2 lists the test results.

The results of a PC grout bleeding rate test were 0% when the lithium nitrite was added in an amount of 5.25% by weight and also when added in an amount of 9.0% by weight, and have proved to be not more than a determination reference value of 0.3%. The results of a volume change rate test were −0.33% when the lithium nitrite was added in an amount of 5.25% by weight and also when added in an

TABLE 2

| | | | | TEST RESULTS | | |
|---|---|---|---|---|---|---|
| TEST ITEMS | | TESTING METHOD | DETERMINATION REFERENCE | ADDED WITH LITHIUM NITRITE OF C × 5.25 WT % | ADDED WITH LITHIUM NITRITE OF C × 6.0 WT % | ADDED WITH LITHIUM NITRITE OF C × 9.0 WT % |
| FLOWABILITY TEST | JP FLOW CONE | JSCE-F 531 | 14 TO 23 SECS. | 15.7 SECS | ~ | 15.2 SECS |
| MATERIAL SEGREGATION RESISTANCE TEST | TILTING TUBE TEST | JSCE-F 534 | NO BLEEDING | NO BLEEDING | ~ | NO BLEEDING |
| BLEEDING RATE TEST | VERTICAL TUBE TEST | JSCE-F 535 | 0.3% OR LESS | 0% | ~ | 0% |
| VOLUME CHANGE RATE TEST | VERTICAL TUBE TEST | JSCE-F 535 | −0.5% TO 0.5% | −0.33% | ~ | −0.33% |
| CHLORIDE ION CONTENT TEST | CALCULATED BASED ON ALL MATERIAL QUALITY TEST RESULTS | — | 0.08 MASS % OR LESS BASED ON CEMENT (1.0 kg/m$^3$ OR LESS) | 0.320 kg/m$^3$ | ~ | 0.311 kg/m$^3$ |
| COMPRESSIVE STRENGTH TEST | | JSCE-G 531 | 30 N/mm$^2$ OR MORE | 35.5 N/mm$^2$ | 32.5N /mm$^2$ | 29.0 N/mm$^2$ |
| | | | EVALUATION | PASSED | PASSED | FAILED |

The results of a PC grout flowability test (Rheology test) were 15.7 seconds when the lithium nitrite was added in an amount of 5.25% by weight and 15.2 seconds when added in an amount of 9.0% by weight, and have proved to be within a determination reference range in either case. The results of a PC grout material segregation resistance test were no recognition of bleeding when the lithium nitrite was added in an amount of 5.25% by weight and also when added in an amount of 9.0% by weight, and there was no problem in material segregation resistance.

amount of 9.0% by weight, and have proved to be within a determination reference range of −0.5% to 0.5%.

The results of a chloride ion content test were 0.320 kg/m$^3$ when the lithium nitrite was added in an amount of 5.25% by weight and 0.311 kg/m$^3$ when added in an amount of 9.0% by weight, and have proved to be within a determination reference range of 1.0 kg/m$^3$.

The results of a PC grout compressive strength test were 35.5N/mm$^2$ when the lithium nitrite was added in an amount of 5.25% by weight and 32.5N/mm$^2$ when added in an amount of 6.0% by weight, and have proved to exceed a determination reference value of 30N/mm². However, the results thereof were 9.0N/mm² when the lithium nitrite was added in an amount of 2.68% by weight and 29.0N/mm² when added in an amount of 9.0% by weight, and have proved to be less than the determination reference value of 30N/mm².

Comparative Experiment

For a comparative experiment, a performance test was carried out based on the assumption of applications to installation in the environment where the ambient temperature can be −10° C., in regards to cases where the calcium nitrite was used instead of the lithium nitrite.

Materials for use in the comparative experiment are as follows.

Cement: Ordinary Portland cement
Calcium nitrite: Aqueous solution containing 30% by weight of calcium nitrite was used, and in terms of the calcium nitrite, the weight ratio of the calcium nitrite to the cement was specified to be, by weight, 2.5%, 4.36% and 6.2%.
Admixture: Same admixture as that used in the experiment 1

Table 3 lists mix proportions for the comparative experiment, and Table 4 lists the results of a compressive strength test involved in the comparative experiment.

TABLE 3

| No. | MIX PROPORTION | W/C (%) | W (kg) | C (kg) | ADMIXTURE | 30 WT % CALCIUM NITRITE AQUEOUS SOLUTION (kg) | WEIGHT RATIO OF CALCIUM NITRITE TO CEMENT (%) |
|---|---|---|---|---|---|---|---|
| 1 | MIX PROPORTION IN 1 m³ | 43% | 489 | 1317 | 13.2 | 110.8 | 2.5 |
| 2 | MIX PROPORTION IN 1 m³ | 43% | 430 | 1309 | 13.1 | 190.4 | 4.36 |
| 3 | MIX PROPORTION IN 1 m³ | 43% | 372 | 1302 | 13.0 | 269.0 | 6.2 |

TABLE 4

COMPRESSIVE STRENGTH TEST REPORTS IN LABORATORY TEST MATERIAL AGE OF 28 DAYS CURING TEMPERATURE OF −10° C.

| No. | AMOUNT OF CALCIUM NITRITE ADDED | TEST PIECE TYPE | COMPRESSIVE STRENGTH (N/mm²) No. 1 | No. 2 | No. 3 | MEAN VALUE (N/mm²) |
|---|---|---|---|---|---|---|
| 1 | 2.5 | ADDED WITH CALCIUM NITRITE (C × 2.5 WT %) | 1.27 | 1.58 | 0.61 | 1.15 |
| 2 | 4.36 | ADDED WITH CALCIUM NITRITE (C × 4.36 WT %) | 1.07 | 1.22 | 1.02 | 1.10 |
| 3 | 6.2 | ADDED WITH CALCIUM NITRITE (C × 6.2 WT %) | 1.99 | 3.00 | 1.58 | 2.19 |

It has been confirmed from the compressive strength test shown in Table 4 that the test results were 1.15N/mm² when the calcium nitrite was added in an amount of 2.5% by weight, 1.10N/mm² when added in an amount of 4.36% by weight and 2.19N/mm² when added in an amount of 6.2% by weight, and have proved to be much less than the determination reference value of 30N/mm², so that the calcium nitrite is considered to be not suitable for adding to the cement grout material in the environment of −10° C.

The results of the PC grout flowability test (Rheology test) were 18.8 seconds when the calcium nitrite was added in an amount of 2.5% by weight, 29.6 seconds when added in an amount of 4.36% by weight and an unmeasurable result when added in an amount of 6.2% by weight, and have proved to be outside the determination reference range in either case. For the calcium nitrite added in an amount of 6.2% by weight, remarkable flowability degradation has been caused to a degree that when scooping up the grout material with a spoon, the scooped grout material has failed to drip from the spoon even when tilted.

Experiment 2

Next, the relation between the amount of the lithium nitrite to be added based on the cement and the compressive strength was examined in regards to adding of the lithium nitrite having been confirmed from the experiment 1 to be effective. In accordance with the PC grout compressive strength testing method (JSCE-G531), a cylindrical-shaped test piece of ϕ5 cm×10 cm was prepared, and air curing at a temperature of −5° C. was performed for 28 days. The compressive strength test was carried out three times per test piece type to determine the mean value. The same admixture for non-bleeding and highly-viscous high-performance cement grout and grouting mortar as that used in the experiment 1 was applied to the experiment 2.

A mix proportion of a base added with no lithium nitrite is as shown in Table 5.

TABLE 5

| No. | MIX PROPORTION | W/C (%) | W (kg) | C (kg) | ADMIXTURE (kg) |
|---|---|---|---|---|---|
| 1 | MIX PROPORTION IN 1 m³ | 43% | 570 | 1327 | 13.3 |

The same materials as those used in the experiment 1 were applied to the experiment 2, and the compressive strength test was carried out for 15 types of test pieces as shown in Table 6 in regards to the amount of the lithium nitrite to be added, in addition to the mix proportion of the base.

Table 6 lists the test results of the compressive strength at the material age of 28 days when the air curing at a temperature of −5° C. was performed. In FIG. 1, the weight ratio of the lithium nitrite to the cement and the mean value of the compressive strengths No. 1 to No. 3 are shown in the form of a bar graph.

TABLE 6

COMPRESSIVE STRENGTH TEST REPORTS IN LABORATORY TEST MATERIAL AGE OF 28 DAYS CURING TEMPERATURE OF −5° C.

| No. | AMOUNT OF LITHIUM NITRITE ADDED | TEST PIECE TYPE | COMPRESSIVE STRENGTH (N/mm$^2$) No. 1 | No. 2 | No. 3 | MEAN VALUE (N/mm$^2$) |
|---|---|---|---|---|---|---|
| — | STANDARD | BASE | 3.6 | 3.2 | 3.8 | 3.6 |
| 1 | 0.5 | ADDED WITH LITHIUM NITRITE (C × 0.5 WT %) | 4.6 | 4.7 | 4.1 | 4.4 |
| 2 | 1 | ADDED WITH LITHIUM NITRITE (C × 1.0 WT %) | 4.1 | 6.5 | 4.7 | 5.1 |
| 3 | 2 | ADDED WITH LITHIUM NITRITE (C × 2.0 WT %) | 16.3 | 27.6 | 18.8 | 20.9 |
| 4 | 3 | ADDED WITH LITHIUM NITRITE (C × 3.0 WT %) | 45.3 | 47.4 | 48.1 | 46.9 |
| 5 | 3.5 | ADDED WITH LITHIUM NITRITE (C × 3.5 WT %) | 49.9 | 49.9 | 48.9 | 49.6 |
| 6 | 4 | ADDED WITH LITHIUM NITRITE (C × 4.0 WT %) | 45.6 | 44.3 | 46.1 | 45.3 |
| 7 | 4.5 | ADDED WITH LITHIUM NITRITE (C × 4.5 WT %) | 45.8 | 44.1 | 44.8 | 44.9 |
| 8 | 5 | ADDED WITH LITHIUM NITRITE (C × 5.0 WT %) | 44.6 | 43.5 | 43.0 | 43.7 |
| 9 | 6 | ADDED WITH LITHIUM NITRITE (C × 6.0 WT %) | 40.9 | 41.5 | 40.6 | 41.0 |
| 10 | 7 | ADDED WITH LITHIUM NITRITE (C × 7.0 WT %) | 36.9 | 37.1 | 37.0 | 37.0 |
| 11 | 8 | ADDED WITH LITHIUM NITRITE (C × 8.0 WT %) | 37.1 | 35.8 | 34.2 | 35.7 |
| 12 | 9 | ADDED WITH LITHIUM NITRITE (C × 9.0 WT %) | 33.6 | 32.4 | 33.2 | 33.1 |
| 13 | 10 | ADDED WITH LITHIUM NITRITE (C × 10.0 WT %) | 30.8 | 31.3 | 31.6 | 31.2 |
| 14 | 11 | ADDED WITH LITHIUM NITRITE (C × 11.0 WT %) | 28.5 | 28.5 | 29.0 | 28.7 |
| 15 | 12 | ADDED WITH LITHIUM NITRITE (C × 12.0 WT %) | 27.0 | 27.5 | 27.8 | 27.4 |

Referring to Table 6 and FIG. 1, the resultant mean values of the compressive strengths were 4.4N/mm$^2$ for a test piece added with the lithium nitrite in an amount of 0.5% by weight based on the cement, 5.1N/mm$^2$ for a test piece added with the lithium nitrite in an amount of 1.0% by weight based on the cement and 20.9N/mm$^2$ for a test piece added with the lithium nitrite in an amount of 2.0% by weight based on the cement, and have proved to be less than the reference strength of 30N/mm$^2$. As a result of visual observation of these test pieces, it has been found that a freezing phenomenon assumed to be caused by freezing of water contained in fresh grout has appeared in the form of ice phases on a test piece surface or cut section, and it can be thus considered that freezing of the water has exerted adverse effect on a hydration reaction.

On the other hand, the resultant mean value of the compressive strengths for a test piece added with the lithium nitrite in an amount of 3.0% by weight based on the cement was as high as 46.9N/mm$^2$ exceeding the reference strength of 30N/mm$^2$, and the compressive strengths exceeding the reference strength of 30N/mm$^2$ were confirmed up to a test piece case where the lithium nitrite was added in an amount of 10.0% by weight based on the cement.

Afterwards, the resultant mean values of the compressive strengths for test pieces respectively added with the lithium nitrite in an amount of 11.0% by weight and 12.0% by weight based on the cement have proved to be less than the reference strength of 30N/mm$^2$.

From the experiment 2, it has been thus found that the lithium nitrite if added in an amount of 3 to 10% by weight based on the cement could ensure the compressive strength exceeding the reference strength of 30N/mm$^2$, resulting in enabling applications to installation even in the environment of −5° C. without problems.

Experiment 3

Next, the air curing at a temperature of −10° C. was performed for 28 days to examine the relation between the amount of the lithium nitrite to be added based on the cement and the compressive strength. A cylindrical-shaped test piece of φ5 cm×10 cm was prepared for the compressive strength test in accordance with the PC grout compressive strength testing method (JSCE-G531). The compressive strength test was carried out three times per test piece type to determine the mean value. The same admixture for non-bleeding and highly-viscous high-performance cement grout and grouting mortar as that used in the experiments 1 and 2 was applied to the experiment 3.

Figure 2:
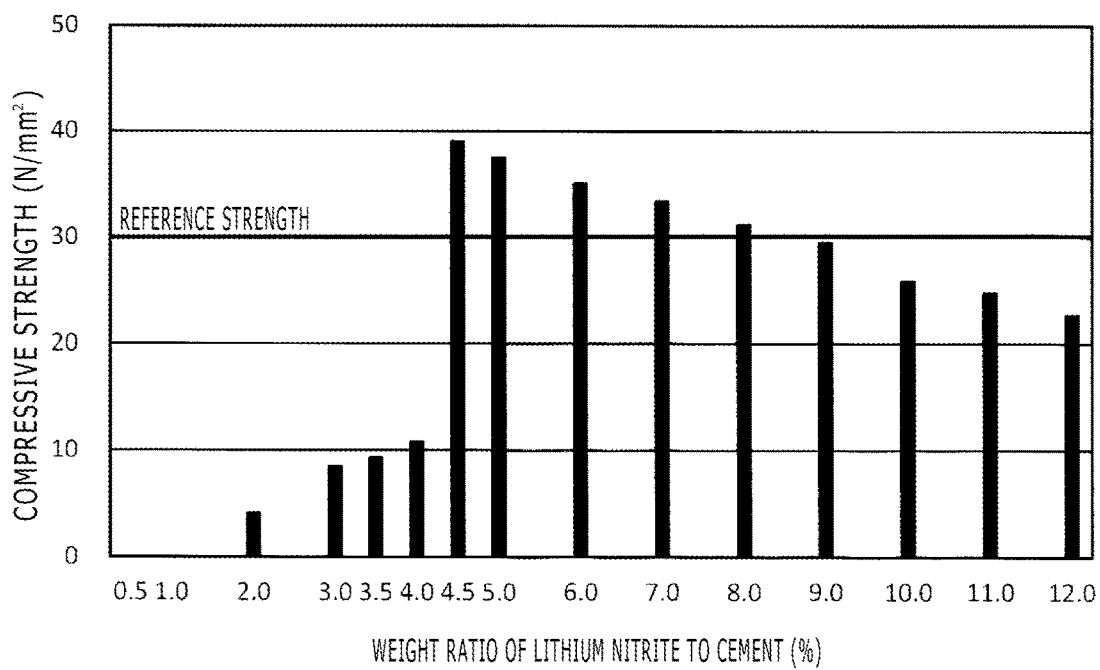
FIG. 2 is a graphic representation of the relation between the weight ratio of lithium nitrite to cement and the compressive strength in the case of a curing temperature having been assumed to be −10° C. in an experiment 3 about the cement grout material according to the present invention.

Table 7 lists the test results of the compressive strength at the material age of 28 days when the air curing at the temperature of −10° C. was performed. In FIG. 2, the weight ratio of the lithium nitrite to the cement and the mean value of the compressive strengths No. 1 to No. 3 are shown in the form of a bar graph.

TABLE 7

COMPRESSIVE STRENGTH TEST REPORTS IN LABORATORY TEST MATERIAL AGE OF 28 DAYS CURING TEMPERATURE OF −10° C.

| No. | AMOUNT OF LITHIUM NITRITE ADDED | TEST PIECE TYPE | COMPRESSIVE STRENGTH (N/mm$^2$) No. 1 | No. 2 | No. 3 | MEAN VALUE (N/mm$^2$) |
|---|---|---|---|---|---|---|
| — | STANDARD | BASE | 0.3 | 0.2 | 0.2 | 0.2 |
| 1 | 0.5 | ADDED WITH LITHIUM NITRITE (C × 0.5 WT %) | | | | |
| 2 | 1 | ADDED WITH LITHIUM NITRITE (C × 1.0 WT %) | | | | |
| 3 | 2 | ADDED WITH LITHIUM NITRITE (C × 2.0 WT %) | 1.9 | 6.8 | 3.5 | 4.1 |
| 4 | 3 | ADDED WITH LITHIUM NITRITE (C × 3.0 WT %) | 8.7 | 8.6 | 8.3 | 8.5 |

TABLE 7-continued

COMPRESSIVE STRENGTH TEST REPORTS IN
LABORATORY TEST MATERIAL AGE OF 28 DAYS
CURING TEMPERATURE OF −10° C.

| No. | AMOUNT OF LITHIUM NITRITE ADDED | TEST PIECE TYPE | COMPRESSIVE STRENGTH (N/mm²) | | | MEAN VALUE (N/mm²) |
|---|---|---|---|---|---|---|
| | | | No. 1 | No. 2 | No. 3 | |
| 5 | 3.5 | ADDED WITH LITHIUM NITRITE (C × 3.5 WT %) | 8.9 | 9.8 | 9.2 | 9.3 |
| 6 | 4 | ADDED WITH LITHIUM NITRITE (C × 4.0 WT %) | 11.6 | 10.2 | 10.6 | 10.8 |
| 7 | 4.5 | ADDED WITH LITHIUM NITRITE (C × 4.5 WT %) | 39.1 | 39.3 | 39.0 | 39.1 |
| 8 | 5 | ADDED WITH LITHIUM NITRITE (C × 5.0 WT %) | 37.2 | 38.2 | 37.0 | 37.5 |
| 9 | 6 | ADDED WITH LITHIUM NITRITE (C × 6.0 WT %) | 35.2 | 35.4 | 34.7 | 35.1 |
| 10 | 7 | ADDED WITH LITHIUM NITRITE (C × 7.0 WT %) | 33.2 | 33.6 | 33.3 | 33.4 |
| 11 | 8 | ADDED WITH LITHIUM NITRITE (C × 8.0 WT %) | 30.9 | 31.1 | 31.8 | 31.2 |
| 12 | 9 | ADDED WITH LITHIUM NITRITE (C × 9.0 WT %) | 29.4 | 29.3 | 29.7 | 29.5 |
| 13 | 10 | ADDED WITH LITHIUM NITRITE (C × 10.0 WT %) | 25.1 | 27.2 | 25.5 | 25.9 |
| 14 | 11 | ADDED WITH LITHIUM NITRITE (C × 11.0 WT %) | 24.6 | 24.8 | 24.9 | 24.8 |
| 15 | 12 | ADDED WITH LITHIUM NITRITE (C × 12.0 WT %) | 21.1 | 23.2 | 23.9 | 22.7 |

Referring to Table 7 and FIG. 2, the resultant mean values of the compressive strengths were 4.1N/mm² for a test piece added with the lithium nitrite in an amount of 2.0% by weight based on the cement, 8.5N/mm² for a test piece added with the lithium nitrite in an amount of 3.0% by weight based on the cement, 9.3N/mm² for a test piece added with the lithium nitrite in an amount of 3.5% by weight based on the cement and 10.8N/mm² for a test piece added with the lithium nitrite in an amount of 4.0% by weight based on the cement, and have proved to be less than the reference strength of 30N/mm².

It is noted that for test pieces respectively added with the lithium nitrite in an amount of 0.5% by weight and 1.0% by weight based on the cement, the compressive strength test has ended in a failure due to the shortage of strength. As a result of visual observation of these test pieces, it has been found that a freezing phenomenon assumed to be caused by freezing of water contained in fresh grout has appeared in the form of ice phases on a test piece surface or cut section, and it can be thus considered that freezing of water has exerted adverse effect on a hydration reaction.

On the other hand, the resultant mean value of the compressive strengths for a test piece added with the lithium nitrite in an amount of 4.5% by weight based on the cement was as high as 39.1N/mm² exceeding the reference strength of 30N/mm², and the compressive strengths exceeding the reference strength of 30N/mm² were confirmed up to a test piece case where the lithium nitrite was added in an amount of 8.0% by weight based on the cement.

Afterwards, the resultant mean values of the compressive strengths for test pieces respectively added with the lithium nitrite in an amount of 9.0 to 12.0% by weight based on the cement have proved to be less than the reference strength of 30N/mm².

From the experiment 3, it has been thus found that the lithium nitrite if added in an amount of 4.5 to 8% by weight based on the cement could ensure the compressive strength exceeding the reference strength of 30N/mm², resulting in enabling applications to installation even in the environment of −10° C. without problems.

Next will be described experiments 4 and 5 about a rust preventive effect of the cement grout material according to the present invention.

Experiment 4

For the experiment 4, an accelerated corrosion test was carried out using a test piece prepared by simulating a situation where a PC steel rod is eccentrically placed inside the sheath in which the grout material is to be filled, for the purpose of confirming that the grout material added with the lithium nitrite is effective in inhibiting the corrosion of a steel member in a severely corrosive environment adversely affected by seawater or salty wind.

A highly viscous grout material was applied as the grout material to be used, and an addition rate of the lithium nitrite was specified to be, by weight, 3%, 6% and 9% for comparison with a case where no lithium nitrite was added.

Table 8 lists the mix proportion factors of the grout material and concrete used in the experiment 4, together with the experiment conditions and items. A salt content in the concrete was specified to be 12 kg/m³, and an accelerated corrosion test (in accordance with JCI-SC3 by Japan Concrete Institute) was applied to a testing method.

TABLE 8

| EXPERIMENT FACTORS | | SPECS |
|---|---|---|
| MIX PROPORTION OF GROUT | W/C (%) | 43% |
| | ADDITION RATE OF LITHIUM NITRITE (C × %) | 0, 3, 6, 9% |
| | ADMIXTURE FOR HIGHLY-VISCOUS GROUT (C × %) | 1% |
| MIX PROPORTION OF CONCRETE | W/C (%) | 66% |
| | CHLORIDE ION CONTENT (kg/m³) | 12 kg/m³ |
| | TARGET SLUMP (cm) | 10 ± 2.5 cm |
| | TARGET AIR AMOUNT (%) | 4.5 ± 1% |
| TESTING METHOD | | ACCELERATED CORROSION TEST (JCI-SC3) |

A test piece used herein was a simulated test piece that simulates a situation where the grout material is exposed to a chloride ion due to the steel sheath damages caused by corrosion resulting from invasion of the chloride ion through a concrete surface.

Figure 3:
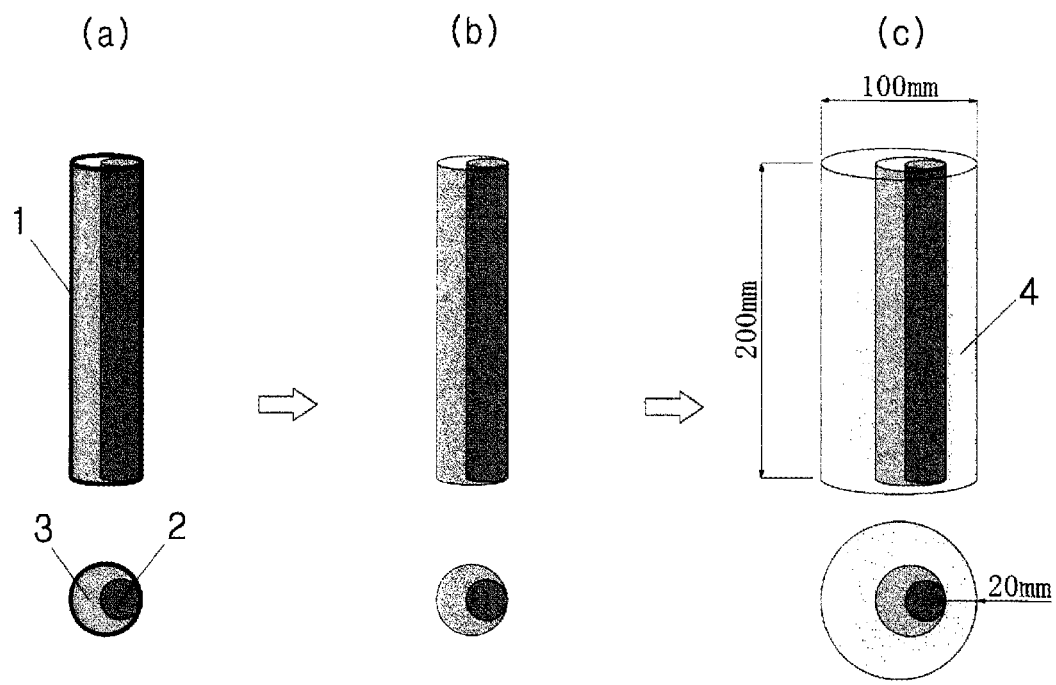
FIG. 3 shows the outline of a method of preparing a test piece for use in an experiment 4 about the cement grout material according to the present invention.

Firstly, as shown in FIG. 3, with a PC steel rod 2 (of φ26 mm) eccentrically placed inside a steel sheath 1 (of φ45 mm), the grout material added with a specific amount of the lithium nitrite was filled in the steel sheath 1, followed by being subjected to sealed curing in an environment of 20° C. till the material age of 28 days (that is, a step as shown in FIG. 3(a)). Thereafter, the steel sheath 1 was completely removed in order to simulate development of the damages caused by corrosion (that is, a step as shown in FIG. 3(b)).

Next, sealed curing was performed till the material age of 28 days through a series of processes in the order of insertion into a predetermined position (a cover thickness of 20 mm) inside a mold of φ100×200 mm, placing of concrete 4 containing salt, and demolding therefrom at the material age of 2 days, thus providing a resultant object as a test piece for use in the accelerated corrosion test (that is, a step as shown in FIG. 3(*c*)).

Figure 4:
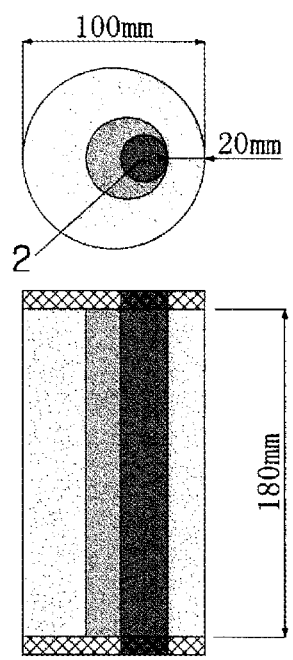
FIG. 4 shows the outline of a test piece to be used for an accelerated corrosion test in the experiment 4.

FIG. 4 shows the outline of the accelerated corrosion test. For the accelerated corrosion test, an alternate drying and wetting process which assumes a wetting period (at a temperature of 70° C. and a relative humidity of 90%) of three days and a drying period (at a temperature of 15° C. and a relative humidity of 65%) of four days to be one drying and wetting cycle was repeated ten cycles, in accordance with a testing method JCI-SC3 "an accelerated corrosion testing method for reinforcing bar steel inside concrete containing salt and a dry-wet cycling method".

Figure 5:
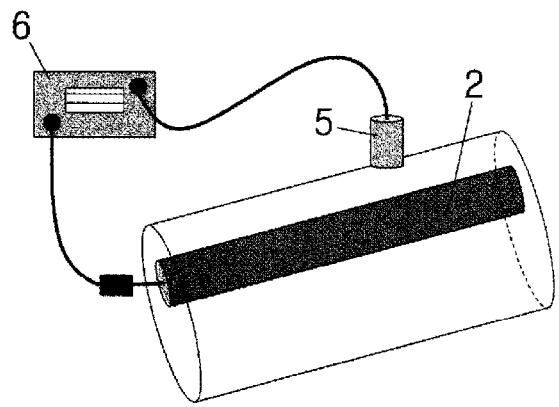
FIG. 5 shows the outline of a spontaneous potential measurement method involved in the accelerated corrosion test in the experiment 4.

Measurement of a spontaneous potential of the PC steel rod 2 was performed every time one drying and wetting cycle was terminated. The spontaneous potential of the PC steel rod 2 was measured with a potentiometer 6 in a situation where a reference electrode 5 was installed at a smallest cover thickness (20 mm) position with respect to the PC steel rod 2, as shown in FIG. 5.

Figure 6:
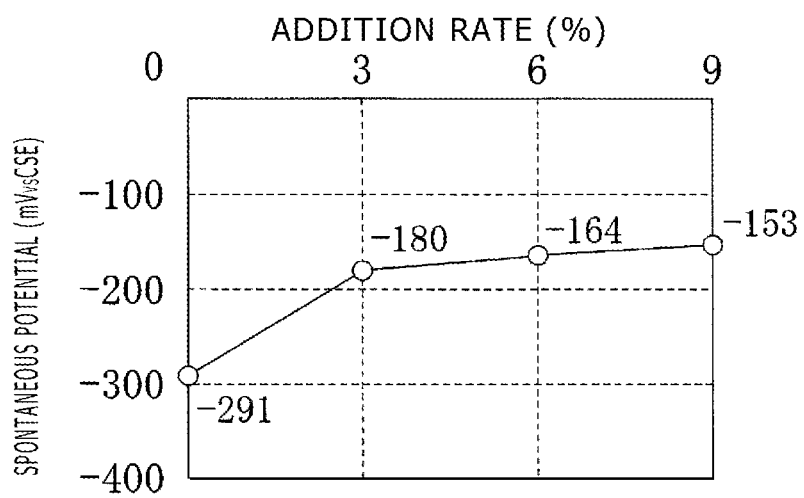
FIG. 6 is a graphic representation of the relation between the spontaneous potential and the addition rate of lithium nitrite in the experiment 4.

FIG. 6 shows the relation between the spontaneous potential and the addition rate of the lithium nitrite. The test piece added with no lithium nitrite presents a value as low as −291 $mV_{VS}CSE$ being the mean value of data obtained at the time when ten drying and wetting cycles were terminated. On the other hand, the test pieces respectively added with the lithium nitrite in the addition rate of 3 to 9% by weight present values of −180 to −153 $mV_{VS}CSE$ higher by 38 to 48% as compared with the test piece added with no lithium nitrite. From the above results, it has been thus confirmed that the grout material added with the lithium nitrite provides the rust preventive effect in the corrosive environment adversely affected by the chloride ion.

Experiment 5

For the experiment 5, a rustproof performance confirmation test was carried out based on open-air exposure by injecting the grout material added with the lithium nitrite into a prestressed concrete testing body, for the purpose of confirming a rustproof performance in a general environment.

Figure 7:
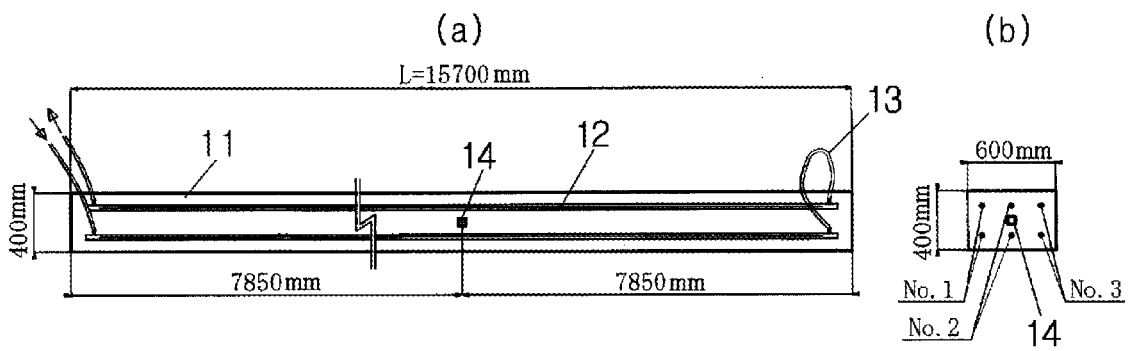
FIG. 7 shows the outline of a prestressed concrete injection testing body in an experiment 5.

FIG. 7 shows the outline of a prestressed concrete injection testing body. A testing body 11 of 600 mm in width, 400 mm in height and 15700 mm in extended length was prepared, wherein a steel sheath tube 12 of φ35 mm was placed along the inside of a cross-section of the testing body, and one PC steel strand (lS21.8 mm) was inserted into the steel sheath tube. One ends of the upper and lower steel sheath tubes 12 were connected together through a hose 13 to inject and discharge the grout material through the other ends thereof. A temperature sensor 14 was placed in a state of being embedded in the center of the testing body 11.

The addition rate of the lithium nitrite was specified to be 5.0% by weight and 9.0% by weight for comparison with a case where no lithium nitrite was added. This confirmation test took place in an outdoor testing site. The testing body was divided into 12 parts to start exposure on the 96-th day after injection of the grout material. A rusting examination for confirming development of the rust in the cross-section by visual observation was conducted in regards to 11 cross-sections on the 56-th day after start of the exposure.

Table 9 lists the relation between the addition rate of the lithium nitrite and the degree of rusting. The degree of rusting is obtained based on calculation by assuming a rust area in the case of addition of no lithium nitrite to be 1.0.

TABLE 9

| SEATH No. | ADDITION RATE OF LITHIUM NITRITE (WT %) | DEGREE OF RUSTING |
|---|---|---|
| 1 | 0 (NO LITHIUM NITRITE) | 1.0 |
| 2 | 9.0 | 0.44 |
| 3 | 5.0 | 0.57 |

On the assumption that the degree of rusting in the case of addition of no lithium nitrite is 1.0, the resultant degrees of rusting were 0.44 when the lithium nitrite was added in the addition rate of 9.0% by weight and 0.57 when added in the addition rate of 5.0% by weight, and have proved to cause 43 to 56% reduction in the rust area. From the above results, the rust preventive effect obtained by addition of the lithium nitrite could be confirmed even in an environment where no chloride ion is supplied.

The invention claimed is:

1. An installation method of a cold weather PC cement grout material containing cement, water and an admixture, wherein lithium nitrite is added to said cold weather PC cement grout material, and the weight ratio of said lithium nitrite to said cement is in the range of 3 to 10% by weight, and the compressive strength at 28 days is 30N/mm² or more, the cold weather PC cement grout material installation method being characterized in that curing and heating is performed such that an installation environment in places to install said cold weather PC cement grout material is kept at a temperature of −5° C. or above when an installation environment where the ambient temperature is lower than −5° C. is reached.

2. An installation method of a cold weather PC cement grout material containing cement, water and an admixture, wherein lithium nitrite is added to said cement grout material, and the weight ratio of said lithium nitrite to said cold weather PC cement is in the range of 4.5 to 8% by weight, and the compressive strength at 28 days is 30N/mm² or more, the cold weather PC cement grout material installation method being characterized in that curing and heating is performed such that an installation environment in places to install said cold weather PC cement grout material is kept at a temperature of −10° C. or above when an installation environment where the ambient temperature is lower than −10° C. is reached.

\* \* \* \* \*